(12) United States Patent
Soler Balcells

(10) Patent No.: US 11,628,872 B2
(45) Date of Patent: Apr. 18, 2023

(54) TRANSPORTER FOR LARGE-FORMAT BUILDING BOARDS

(71) Applicant: GERMANS BOADA, S.A., Rubi (ES)

(72) Inventor: Jordi Soler Balcells, Rubi (ES)

(73) Assignee: GERMANS BOADA, S.A., Rubi (ES)

(*) Notice: Subject to any disclaimer, the term of this patent is extended or adjusted under 35 U.S.C. 154(b) by 484 days.

(21) Appl. No.: 16/775,004

(22) Filed: Jan. 28, 2020

(65) Prior Publication Data
US 2020/0307666 A1 Oct. 1, 2020

(30) Foreign Application Priority Data

Mar. 26, 2019 (ES) .............................. ES201930278

(51) Int. Cl.
| | | |
|---|---|---|
| *B62B 3/10* | (2006.01) | |
| *B62B 3/02* | (2006.01) | |
| *B62B 3/04* | (2006.01) | |
| *B62B 5/04* | (2006.01) | |

(52) U.S. Cl.
CPC ................ *B62B 3/108* (2013.01); *B62B 3/02* (2013.01); *B62B 3/04* (2013.01); *B62B 5/04* (2013.01); *B62B 2202/62* (2013.01); *B62B 2203/30* (2013.01); *B62B 2203/70* (2013.01); *B62B 2206/02* (2013.01)

(58) Field of Classification Search
CPC .. B62B 3/108; B62B 3/02; B62B 3/04; B62B 5/04; B62B 2202/62; B62B 2203/30; B62B 2203/70; B62B 2206/02; B62B 2203/05
See application file for complete search history.

(56) References Cited

U.S. PATENT DOCUMENTS

| | | | | |
|---|---|---|---|---|
| 4,302,023 | A * | 11/1981 | Kiesz ........................ | B62B 3/02 |
| | | | | 108/106 |
| 5,599,031 | A * | 2/1997 | Hodges ................. | B62B 5/0083 |
| | | | | 280/35 |
| 9,481,387 | B2 * | 11/2016 | Della Polla ............. | B62B 3/005 |
| 10,272,935 | B1 * | 4/2019 | Jordan ................. | B65H 49/325 |
| 10,912,686 | B2 * | 2/2021 | Pierce ....................... | B62B 3/10 |
| 2008/0150244 | A1 * | 6/2008 | Carlei ................... | B65G 49/061 |
| | | | | 414/572 |
| 2010/0181411 | A1 * | 7/2010 | Fernandez .............. | B62B 3/104 |
| | | | | 414/800 |

(Continued)

FOREIGN PATENT DOCUMENTS

| | | | | |
|---|---|---|---|---|
| AT | 11193 U1 | * | 4/2010 | ............. B60P 3/002 |
| DE | 10004245 A1 | * | 8/2001 | ............... B62B 3/12 |

(Continued)

*Primary Examiner* — James A Shriver, II
*Assistant Examiner* — Michael T. Walsh
(74) *Attorney, Agent, or Firm* — Hodgson Russ LLP

(57) ABSTRACT

The invention relates to a device for transporting large-format building boards, including a cart provided with wheels for the movement thereof and a transporter with suction cups for securing the large-format board to be transported. The cart comprises at the top removable coupling means of a modular transporter carrying suction cups on at least one of the ends thereof, front and rear, an extendable extension is provided with fastening means for fastening the cart in an essentially protruding position forming a support on the floor during the unloading of the device towards the end carrying said extension.

10 Claims, 5 Drawing Sheets

(56) References Cited

U.S. PATENT DOCUMENTS

| | | | | |
|---|---|---|---|---|
| 2011/0108658 | A1* | 5/2011 | Factor | B65H 49/24 |
| | | | | 242/594 |
| 2017/0044782 | A1* | 2/2017 | Carlei | B62B 3/02 |
| 2019/0038485 | A1* | 2/2019 | Minardo | A61G 5/10 |
| 2020/0086904 | A1* | 3/2020 | Reynoso | B62B 3/108 |
| 2020/0156912 | A1* | 5/2020 | Carlei | B66F 9/181 |

FOREIGN PATENT DOCUMENTS

| | | | | | |
|---|---|---|---|---|---|
| DE | 202009007690 | U1 * | 9/2009 | | B60P 3/002 |
| FR | 2946376 | A1 * | 12/2010 | | B62B 3/02 |
| WO | WO-2010068875 | A1 * | 6/2010 | | G05G 1/085 |

* cited by examiner

TRANSPORTER FOR LARGE-FORMAT BUILDING BOARDS

CROSS-REFERENCE TO RELATED APPLICATION

This application claims priority to Spanish Patent Application No. 201930278, filed Mar. 26, 2019, the entire disclosure of which is incorporated herein by reference.

TECHNICAL FIELD

The present invention relates to a device for transporting large-format building boards, such as boards made of ceramic or glass, or other large, flat boards; this device being applicable to the construction sector.

BACKGROUND

In the construction sector, the use of large-format material boards for example ceramic parts or glass parts, is becoming widespread, and these boards are valued as they reduce the number of joints existing on the surface to be covered and improve the aesthetic finish of the surface formed by them.

These large-format boards have a very heavy weight which especially hinders the grip and handling thereof, as well as the manual transportation thereof to the cutting or assembly areas at the installation point.

In order to move these boards, given the heavy weight thereof, it is necessary to do so by means of transportation carts provided with wheels for the movement thereof and a structure which has suction cups for fastening the boards.

It is common that once the boards have been placed on the transportation cart, they must be placed on a table to perform certain operations, such as custom cutting or, in the case of the ceramic boards, applying cement on the board prior to the installation thereof. Once these operations have been performed, the board is placed back on the transportation cart in order for it to be transferred to the installation point.

Under normal conditions, the operation of passing the board from the cart to the table, or vice versa, requires a high amount of effort from the operators, due to the heavy weight of the boards.

Therefore, the technical problem that arises is the development of a device for transporting large-format building boards, which in addition to transporting the boards, facilitates the tasks of collecting or delivering the boards, passing them for example from a horizontal position to a substantially vertical position, or collecting a board in a substantially vertical position in order to lift it to the transportation device; minimising the effort to be made by the operators.

The applicant is unaware of the existence on the market of devices for transporting large-format building boards, which have the features of the invention.

SUMMARY

The device for transporting large-format building boards, object of this invention, is of the type described in the preamble of the first claim and comprises a cart provided with wheels for the movement thereof and a transporter with suction cups for securing the board to be transported on the cart.

This device has technical features, included in the attached claims, which enable the problem described to be satisfactorily solved, reducing the effort to be made by the operators, both during the collection and in the delivery of said boards; in order to move the boards from a horizontal position to a substantially vertical position, or vice versa, or in order to facilitate the collection of a board in a substantially vertical position in order to place it on the transportation cart.

According to the invention, the cart comprises at the top means for the removable coupling of a modular transporter carrying suction cups to grip the boards to be handled and, on at least one of the ends thereof, front and rear, an extendable extension is provided with fastening means for fastening the cart in an essentially protruding position, said extendable extension forming supporting means on the floor during the unloading of the device, towards the front area or towards the rear area.

This feature enables a board fastened on the transportation device to be unloaded towards the front area or towards the rear area together with the device, in order to arrange it in a horizontal position or in a vertical position, minimising the manual effort to be made by the operators in this operation.

The device comprises, on the front and rear ends, non-slip blocks for the stable support on the floor of the cart or of the extension thereof, during the unloading of the device towards the front area or the rear area.

The removable nature of the modular transporter enables it to be separated from the cart and manually handled in order to collect or deliver a board fastened by means of the suction cups of said modular transporter.

This feature also enables the manual transportation of the board fastened on the modular transporter to be performed in a horizontal position, which is more comfortable for the user, since the position of the arms in this case is more ergonomic.

Another feature of the invention is determined by the modular nature of the transporter which enables the dimensions thereof to be adjusted depending on the size of the boards to be handled and transported.

According to the invention, this modular transporter comprises: at least two parallel crossbars able to be coupled to the coupling means of the cart; bars perpendicular to said crossbars; fastening means for fastening the bars at any point along the crossbars, and grip handles provided with tightening knobs for the fastening thereof at any point of the length of the bars.

Said handles have two misaligned segments: a first segment intended to be fastened to the corresponding bar by means of fastening knobs, and a second segment parallel to the first segment and forming a grip area. This configuration of the handles improves the ergonomics, since the second segment is laterally spaced from the bar, and consequently the operations for transporting and handling the assembly.

In order to ensure stable support of the transporter on the floor, when it is disassembled from the cart, for example to collect a board which is laterally supported on a wall and in a substantially vertical position, the crossbars of said modular transporter comprise at the ends thereof non-slip blocks.

The aforementioned features and other features set forth in the attached claims will be more readily understood in view of the exemplary embodiment shown in the figures described below.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
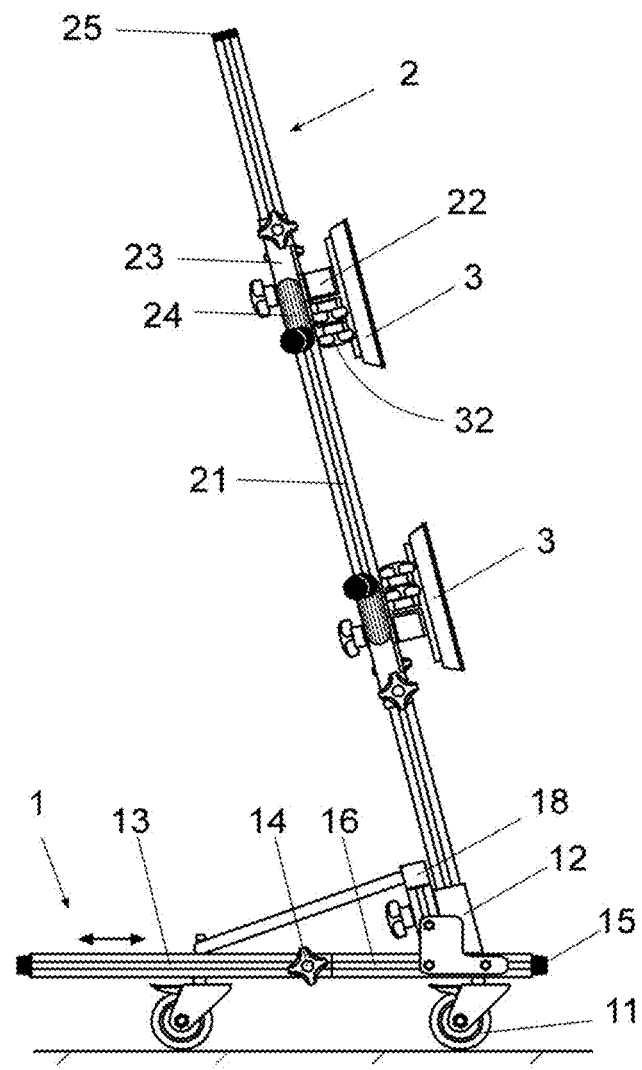
FIG. 1 shows a profile view of an exemplary embodiment of the device for transporting large-format building boards with the modular transporter coupled to the cart, according to the invention.

In FIG. 1, the device for transporting large-format building boards comprises a cart (1) provided with wheels (11) and removable coupling means (12) of a modular transporter (2) equipped with suction cups (3) for securing the boards to be transported.

The cart (1) comprises an extension (13) extendable towards the rear area provided with fastening means (14) for fastening the cart (1) in an essentially protruding position.

The cart (1) comprises non-slip blocks (15), located specifically on the front end thereof and on the rear end of the extendable extension (13), for the support thereof on the floor during the unloading of the device towards the front or towards the rear, and the collection or delivery of a board (P) in a horizontal position.

Figure 2:
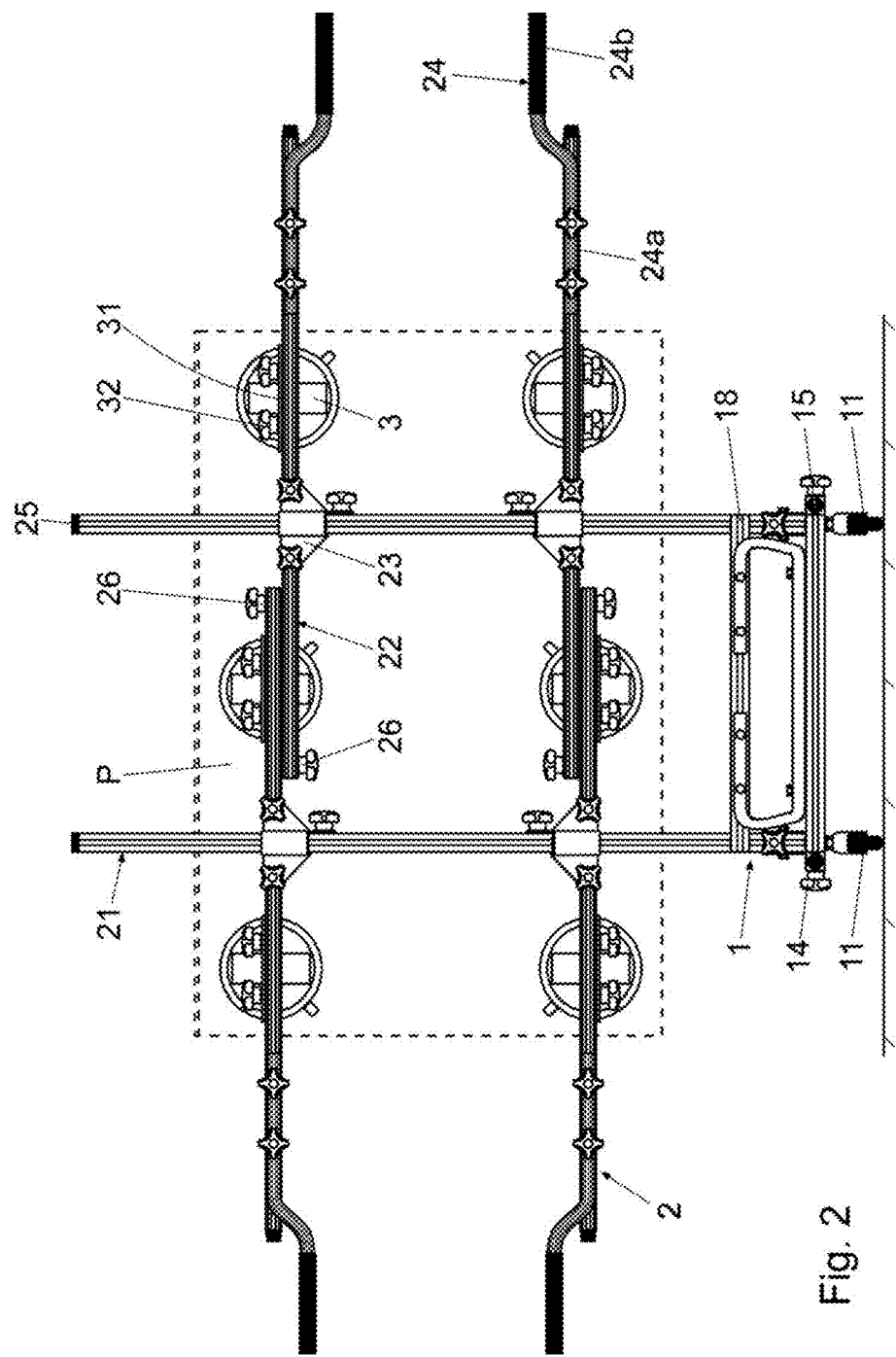
FIG. 2 shows a rear elevation view of the device of the previous figure.

In FIG. 2, the modular transporter (2) comprises: two parallel crossbars (21) suitable for being fastened to the coupling means (12) defined on the cart (1); bars (22) perpendicular to said crossbars (21); and fastening means (23) for fastening the bars (22) at any point along the crossbars (21). These fastening means (23) are represented by boards with tightening knobs.

The possibility of regulating the height position of the bars (22) with respect to the crossbars (21) enables the suction cups (3) to be conveniently distributed on the surface of the boards (P) to be transported depending on the dimensions of said boards.

These suction cups (3) have an anchoring board (31) for the support thereof on the outer surface of a bar (22) and tightening knobs (32) for the fastening thereof at any point along the bars (22); enabling the quick anchoring of the suction cups directly at the desired point, without the suction cups needing to run along the bar (22).

The modular transporter (2) further comprises grip handles (24) fastened to the bars (22) by means of tightening knobs. Said handles have two misaligned segments: a first segment (24a) intended to be fastened to the corresponding crossbar and a second segment (24b), parallel to the previous one and which in the use position is laterally spaced from the corresponding bar (22).

Figure 6:
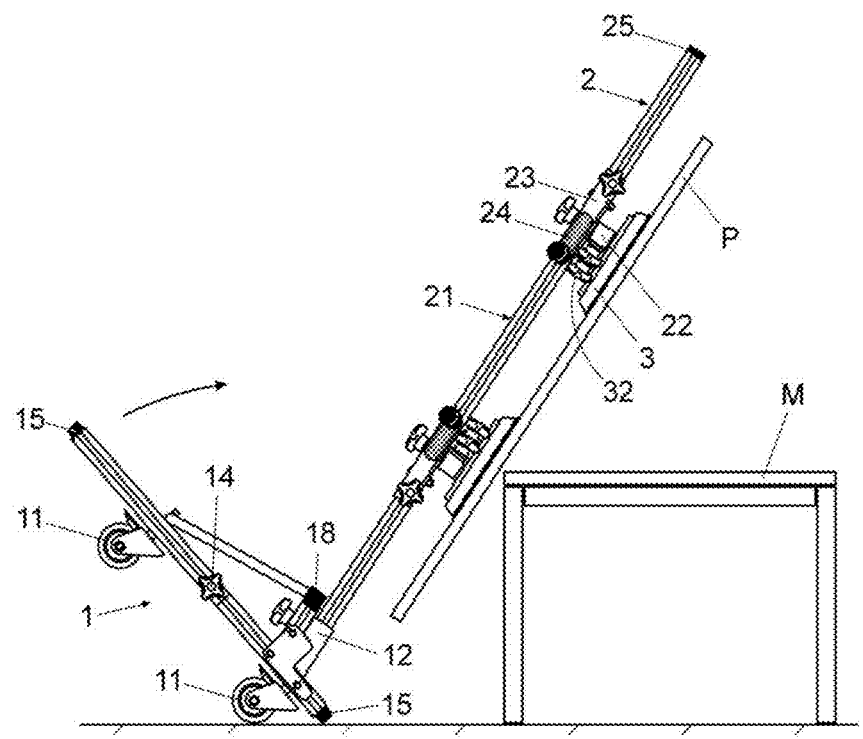
FIGS. 6 and 7 show corresponding profile views of the device, during the unloading thereof towards the front area.

The crossbars (21) of the modular transporter (2) comprise at the ends thereof non-slip blocks (25) for the support thereof on the floor, in a substantially vertical position, when it is disassembled from the cart, as shown in FIG. 6.

In the example shown in FIG. 2, each of the bars (22) of the modular transporter (2) is made up of two profiles which are laterally attached, superimposed to a greater and lesser extent, and fastened to each other by tightening knobs (26), forming a bar with variable length.

In order to perform the coupling of the modular transporter (2) onto the cart (1), it is enough to introduce the lower ends of the crossbars (21) into the coupling means (12) defined at the top of the cart (1) and made up of two tube segments with a cross section suitable for receiving said lower ends of the crossbars (21).

The tube segments forming means (12) for the removable coupling of the modular transporter (2) are oriented towards the upper area and inclined towards the rear end of the cart, in order to ensure the stability of the assembly during the supporting of the board (P).

Figure 3:
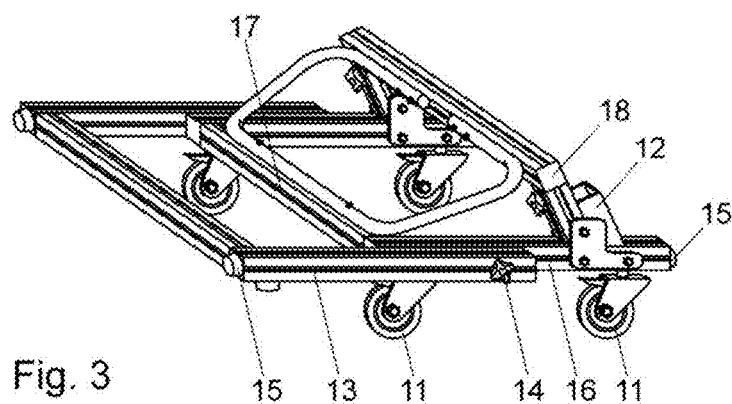
FIG. 3 shows a top side perspective view of the cart without the modular transporter.

In FIG. 3, the cart (1) has a frame-like structure formed by two coplanar lateral profiles (16), a rear profile (17) and a raised front profile (18) fastened to the lateral profiles (16) and to the rear profile (17).

Figure 4:
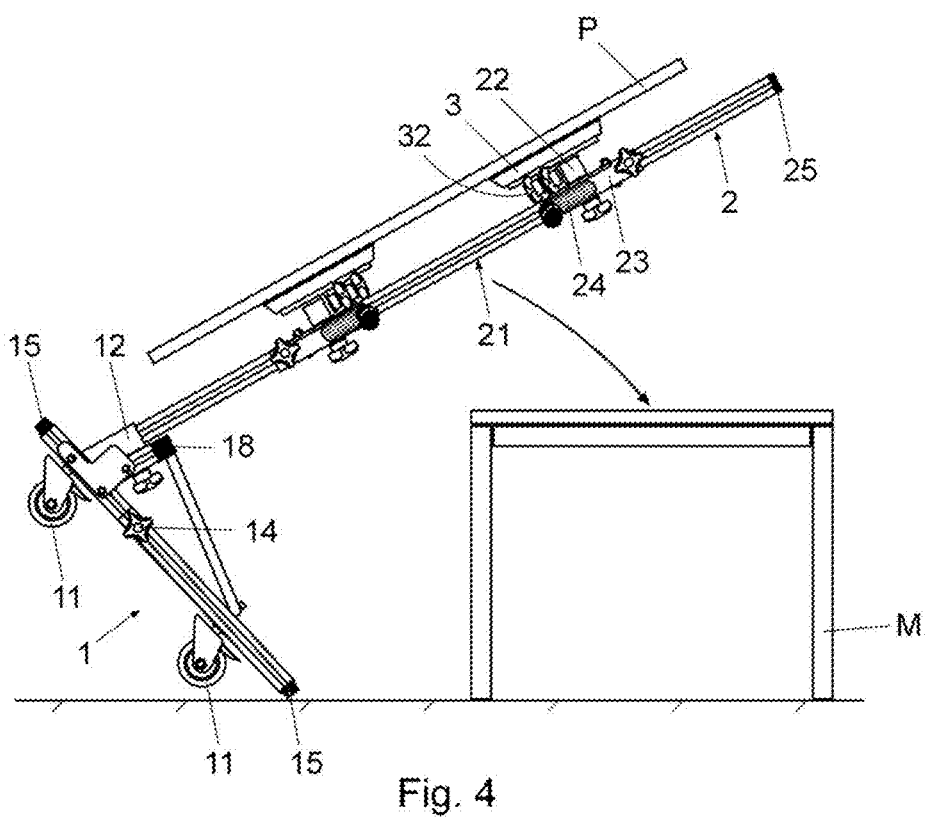
FIGS. 4 and 5 show corresponding profile views of the device of the previous figures during the unloading thereof towards the rear area, using the rear extension as a supporting point on the floor, in order to place the board in a horizontal position suitable for applying cement on the rear surface thereof.
Figure 5:
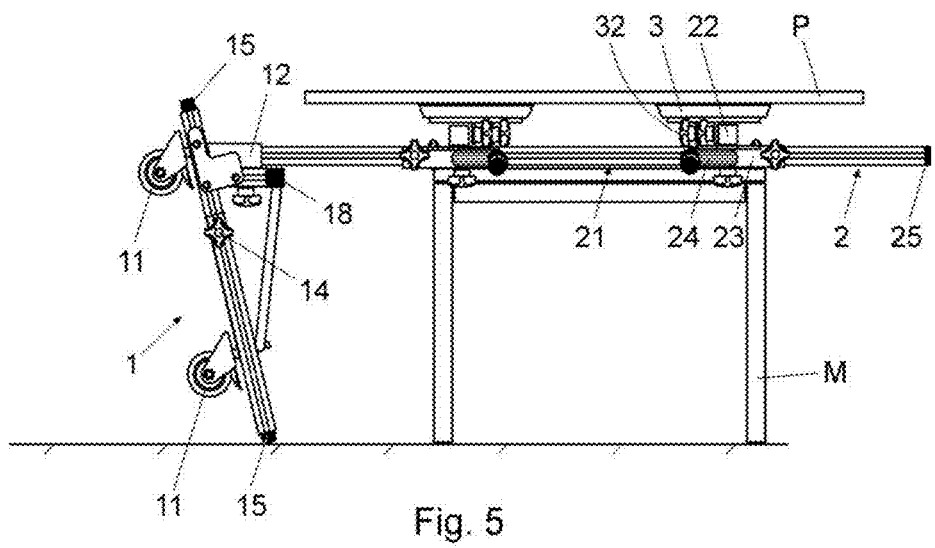

FIGS. 4 and 5 show the movements to be performed for the unloading towards the rear of the device together with a large board (P) assembled thereon, in order to arrange the transporter supported on a table (M) and the board (P) with the bad or rear side thereof facing up.

As seen in FIG. 4, during the unloading of the device, the extension (13) of the cart (1) is supported on the floor by means of the non-slip blocks (25), minimising the effort of the operators.

Figure 7:
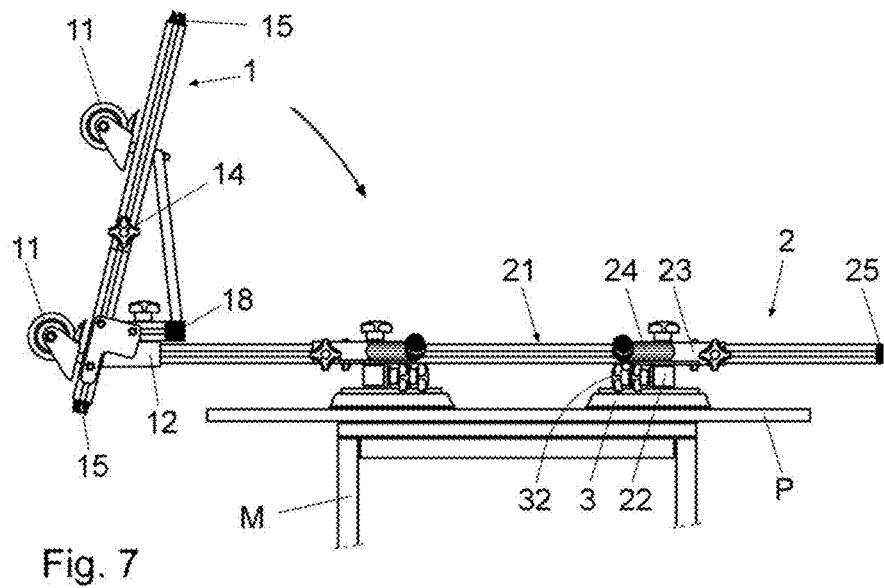

FIGS. 6 and 7 show the operation of the unloading of the device towards the front area, the cart (1) then being supported on the floor with the non-slip blocks (25) located on the front end of the cart (1).

Figure 8:
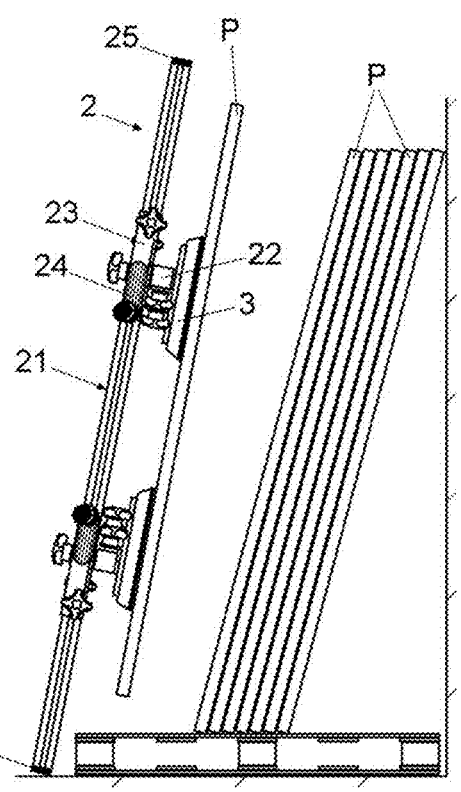
FIG. 8 shows a profile view of the disassembled modular transporter of the cart, during the collection of a large-format board for the handling or positioning thereof on the transportation cart.

The modular transporter (2) can be disassembled from the cart (1), for example to collect a board (P) as shown in FIG. 8, and transport it manually by securing the modular transporter (2) with the grip handles (24).

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A device for transporting large-format building boards, comprising:
   a cart (1) provided with wheels (11) for the movement thereof;
   a modular transporter (2) with suction cups (3) for securing the large-format building board (P) to be transported coupled to the cart (1) by a coupling means (12);
   wherein the cart (1) has an extendable extension (13), and is provided with fastening means (14) for fastening-the cart (1) in an essentially protruding position, wherein the extension (13) forms a pivot support, such that during unloading of the large format building board (P) from the device, the extension (13) is extended in a direction away from the modular transporter to abut the floor.

2. The device, according to claim 1, wherein the cart (1) comprises on the front and rear ends, non-slip blocks (15) for the stable support on the floor of the cart (1) or of the extension (13) thereof, during the unloading of the large-format building board (P).

3. The device, according to claim 1, wherein the modular transporter (2) comprises: at least two parallel crossbars (21) able to be coupled to the coupling means (12) of the cart (1);

bars (22) perpendicular to said crossbars (21); fastening means (23) for fastening the bars (22) at any point along the crossbars (21), and grip handles (24) fastened to the bars by means of tightening knobs.

4. The device, according to claim 3, wherein the grip handles (24) comprise two corresponding misaligned segments: a first segment (24a) intended to be fastened to the bar (22) and a second segment (24b), parallel to the previous one and which in the use position is laterally spaced from the corresponding bar (22).

5. The device, according to claim 3, wherein the crossbars (21) of the modular transporter (2) comprise at the ends thereof non-slip blocks (25) for the stable support thereof on the floor, in a substantially vertical position, when it is disassembled from the cart (1).

6. The device, according to claim 3, wherein each of the bars (22) of the transporter is made up of a single profile, or of successive profiles which are attached laterally, superimposed to a greater and lesser extent, and fastened to each other by tightening knobs (26), forming a bar (22) with variable length.

7. The device, according to claim 3, wherein the coupling means (12) defined on the cart (1) for the removable coupling of the modular transporter (2), comprise tube segments, with a cross section suitable for receiving the lower ends of the crossbars (21) of the modular transporter (2).

8. The device, according to claim 7, wherein the tube segments forming removable coupling means (12) of the modular transporter (2) in the cart (1) are oriented towards the upper area and inclined towards a rear end of the cart (1).

9. The device, according to claim 1, wherein the cart (1) has a frame-like structure formed by two coplanar lateral profiles (16), a rear profile (17) and a raised front profile (18) fastened to the lateral profiles (16) and to the rear profile (17).

10. The device, according to claim 3, wherein the suction cups (3) have an anchoring board (31) for the support thereof on the outer surface of a bar (22) and tightening knobs (32) for the fastening thereof at any point along the bars (22), without the suction cups needing to run along the bar (22).

* * * * *